(12) United States Patent
Ougier et al.

(10) Patent No.: US 12,304,112 B2
(45) Date of Patent: May 20, 2025

(54) INSTALLATION AND METHOD FOR COEXTRUSION

(71) Applicant: Compagnie Generale Des Etablissements Michelin, Clermont-Ferrand (FR)

(72) Inventors: Christophe Ougier, Clermont-Ferrand (FR); Arnaud Letocart, Clermont-Ferrand (FR)

(73) Assignee: Compagnie Generale Des Etablissements Michelin, Clermont-Ferrand (FR)

( * ) Notice: Subject to any disclaimer, the term of this patent is extended or adjusted under 35 U.S.C. 154(b) by 241 days.

(21) Appl. No.: 16/622,715

(22) PCT Filed: Jun. 21, 2018

(86) PCT No.: PCT/FR2018/051512
§ 371 (c)(1),
(2) Date: Dec. 13, 2019

(87) PCT Pub. No.: WO2018/234711
PCT Pub. Date: Dec. 27, 2018

(65) Prior Publication Data
US 2020/0180203 A1    Jun. 11, 2020

(30) Foreign Application Priority Data
Jun. 22, 2017   (FR) ........................ 1755715

(51) Int. Cl.
*B29C 48/21* (2019.01)
*B29B 7/74* (2006.01)
(Continued)

(52) U.S. Cl.
CPC ............ *B29B 7/7495* (2013.01); *B29C 48/21* (2019.02); *B29C 48/2888* (2019.02);
(Continued)

(58) Field of Classification Search
CPC ............ B29B 7/74595; B29C 48/2888; B29C 48/387; B29C 48/49; B29C 48/21;
(Continued)

(56) References Cited

U.S. PATENT DOCUMENTS

| | | | |
|---|---|---|---|
| 5,076,777 A * | 12/1991 | Schmitt ................... | B29C 48/21 |
| | | | 425/133.5 |
| 2005/0147518 A1* | 7/2005 | Nicolas ................... | B29C 48/92 |
| | | | 418/201.1 |

(Continued)

FOREIGN PATENT DOCUMENTS

| | | | | |
|---|---|---|---|---|
| CN | 2015158282 | * | 10/2015 | ............. B29C 47/38 |
| CN | 105711053 A | | 6/2016 | |

(Continued)

OTHER PUBLICATIONS

International Search Report issued in PCT/FR2018/051512 mailed Oct. 24, 2018.

(Continued)

*Primary Examiner* — Christopher M Rodd
*Assistant Examiner* — Shibin Liang
(74) *Attorney, Agent, or Firm* — Dickinson Wright PLLC; Steven C. Hurles (57) ABSTRACT

The installation is for producing a coextruded profiled element for tires that is made from rubber compounds of different compositions. The installation includes at least one first extruder having a screw with a longitudinal axis and at least one second extruder having a screw with a different longitudinal axis. An extrusion head is connected to each of the extruders by appropriate ducts. The feed inlet of each extruder is connected to the delivery orifice of a gear pump.

8 Claims, 4 Drawing Sheets

(51) Int. Cl.
- *B29C 48/285* (2019.01)
- *B29C 48/37* (2019.01)
- *B29C 48/375* (2019.01)
- *B29C 48/49* (2019.01)
- B29C 48/07 (2019.01)
- B29C 48/16 (2019.01)
- B29C 48/92 (2019.01)
- B29K 21/00 (2006.01)
- B29L 30/00 (2006.01)

(52) U.S. Cl.
CPC ............ *B29C 48/37* (2019.02); *B29C 48/387* (2019.02); *B29C 48/49* (2019.02); *B29C 48/07* (2019.02); *B29C 48/16* (2019.02); *B29C 48/286* (2019.02); *B29C 48/92* (2019.02); *B29C 2948/92885* (2019.02); *B29K 2021/00* (2013.01); *B29L 2030/002* (2013.01)

(58) Field of Classification Search
CPC ......... B29C 48/37; B29C 48/92; B29C 48/16; B29C 2948/92885; B29C 48/07; B29C 48/286; B29C 48/00; B29C 45/76; B29K 2021/00; B29L 2030/002
See application file for complete search history.

(56) References Cited

U.S. PATENT DOCUMENTS

| | | | |
|---|---|---|---|
| 2009/0166915 A1* | 7/2009 | Uchida | .................. B29C 48/37 |
| | | | 264/176.1 |
| 2012/0161366 A1* | 6/2012 | Burg | ...................... B29C 48/37 |
| | | | 264/331.11 |
| 2013/0161857 A1 | 6/2013 | Milan et al. | |
| 2019/0152116 A1* | 5/2019 | Dyrlund | .................. B29C 48/21 |

FOREIGN PATENT DOCUMENTS

| | | | |
|---|---|---|---|
| DE | 19635706 | A1 | 3/1998 |
| EP | 0642913 | A1 | 3/1995 |
| EP | 3037241 | A1 | 6/2016 |
| JP | 58128817 | A | 8/1983 |
| WO | 9809792 | A1 | 3/1998 |
| WO | 03016012 | A1 | 2/2003 |

* cited by examiner

INSTALLATION AND METHOD FOR COEXTRUSION

CROSS-REFERENCE TO RELATED APPLICATIONS

The present application claims priority to PCT International Patent Application No. PCT/FR2018/051512, filed Jun. 21, 2018, which claims priority to FR 1755715, filed Jun. 22, 2017.

BACKGROUND

1. Field of the Invention

The present disclosure relates to the field of the extrusion of rubber compounds more particularly intended for the manufacture of tires. More particularly, it relates to the manufacture of a coextruded profiled element made from rubber compounds of different compositions that is used in particular for manufacturing a tread or sidewall of a tire.

2. Related Art

As is known, an installation for manufacturing complex profiled elements by extrusion of at least two rubber compounds of different compositions, or coextrusion, comprises at least two extruders connected to an extrusion head. Each extruder is formed of a cylindrical body or barrel which is stationary, and inside which there is a screw that is coaxial with the longitudinal axis of the barrel and driven in rotation about this axis. Its purpose is to homogenize a rubber compound and drive it towards an outlet orifice after it has been received in the shape of a strip of compound at a feed orifice. For a complex product, the outlet orifice of each extruder leads into a common extrusion head that thus receives rubber compounds of different compositions and comprises, at its outlet, an extrusion die that defines the profile of the strip of rubber. This profile is defined by a fixed profiled blade or a fixed profiled wall that cooperates with a rotary roller.

Tire manufacture increasingly calls for the use of complex products obtained in the form of complexed semifinished products in order to reduce the number of successive product-laying operations during tire building and thus reduce costs and improve precision.

Nowadays, the number of different rubbery compounds used for manufacturing a single tire is tending to increase, so as to be able to improve the properties of the tire according to the region in which these compounds are located. This applies more particularly in the case of a tire tread which in general comprised two different rubbery compounds, to which other compounds are currently added, for example an electrically conducting compound and compounds intended to cover the sidewalls in the shoulder regions.

During manufacture of a profiled element by coextrusion, compounds of different compositions are made to converge towards an outlet die which means that bonding is made to occur in the raw state, at the pressure and temperature of the compounds, without contact with the open air and prior to profiling. This makes it possible to obtain good integrity of the coextruded product in the region of the interfaces between the compounds. However, on account of the fact that the rheological properties differ from one compound to another, it is difficult to gain perfect control over the geometry of the assembly, notably as a result of the difficulty there is in positioning a product made from a certain compound in relation to another and in maintaining this over time.

The positioning of a product in relation to another is dictated by a profiling device or outlet die in which the different compounds coming from the different extruders arrive, in the form of extrudates, which do not mix, in order to form the coextruded complex profiled element at the outlet. In practice, the geometric shape and the dimensions of the profiling device are determined by several successive iteration loops. Once the device has been optimized, it yields the anticipated results only when the extruders are operating in steady state and at a clearly determined speed.

The non-compliant coextruded profiled element currently represents a non-negligible proportion of the production output of the machine. The shorter the production runs with a view to achieving flexible production, the higher the scrappage rates (5% to 20% in practice). This results in a drop in the profitability of the machine. Moreover, because material wastage is economically unacceptable, scrap referred to as mixed (or multi-compound) scrap has to be stored, re-homogenized, and reintroduced in a controlled, precisely metered manner, into subsequent production runs. The production on-cost that this generates is furthermore accompanied by a drop in the performance of the product ultimately obtained, which is in part contaminated with the other compounds.

Furthermore, the coextruded product has to be continuously checked, by measuring the linear weight of the product being output and comparing it with a preestablished weight. In addition, the shape and dimensions of the complex product (width, thickness) are evaluated using different sensors.

Thus, document WO 2015/028166 is known which describes a method for manufacturing a tire tread by the coextrusion of different compounds coming from several extruders arranged in parallel, in which method the transverse profile is analysed by contactless sensors. The profile of each part that makes up the tread is read by a sensor, the profiles then being analysed by a central control unit, which controls the operation of each extruder. The operation of an extruder is set up by adjusting the rotational speed of the screw and the pressure at the end of the screw, just before the outlet. However, its operation is also dependent on the compound having been brought to the correct temperature, on the die having been brought to the correct temperature, on the extrusion rate, on the rheology of the compound, on disruptions to the strip feed, etc. All of these factors disturb the throughput of the extruder, which means that numerous settings-up are required before a compliant product is obtained.

Moreover, the measurements taken with optical sensors are however not enough to guarantee that the different constituent parts of a complex product are correcly positioned relative to one another therewithin, nor to visualize their respective interfaces, especially when they are superposed. As a result, a final check is made by taking samples. The samples taken during all of this optimization work cannot be recycled because the assembly is a composite assembly, and they are discarded, generating wastage of material and increasing the overall cost of the products obtained.

Also known is the document CN102173042, which describes an arrangement of two extruders that each have a gear pump at their outlet for producing a coextruded product made from rubber. Such an arrangement makes it possible to adjust the flow rate of the material output by an extruder by adjusting the speed of the pump at the outlet. The major drawback with such a solution is the significant bulk of the gear pump, which has a direct impact on the size of the shaping tooling, especially when the number of paths and thus of extruders is greater than two. The tooling is therefore expensive and difficult to handle, and it takes longer to achieve the correct temperature. Moreover, if, in relation to bulk, the diameter of the gears of the pump were reduced, the latter would then, in order to evacuate the material output by the extruder, have to rotate at a higher speed, and this would have the consequence of heating the rubber, there being a risk of premature vulcanization.

SUMMARY OF THE INVENTION

It is an objective of the disclosure to remedy the drawbacks of the abovementioned documents.

This objective is achieved by the disclosure, which proposes a coextrusion installation for producing a coextruded profiled element for tires that is made from rubber compounds of different compositions, having at least one first extruder having a screw with a longitudinal axis, and at least one second extruder having a screw with a longitudinal axis, and an extrusion head connected to each of said extruders by appropriate ducts, characterized in that the feed inlet of each extruder is connected to the delivery orifice of a gear pump.

In other words, each extruder of a coextrusion installation is fed with an elastomer compound coming directly from a gear pump. In this way, a positive displacement coextrusion installation is obtained, in which the outlets of the different extruders converge towards a common extrusion head, the gear pumps being placed upstream of the latter. In this case, there is no compromise as regards the diameter of the gears of the pump, these gears being dimensioned so as to ensure the necessary feed for the operation of the extruder, without excessive heating of the elastomer compound.

Preferably, the axes of the extruders make an acute angle between one another.

The longitudinal axes of the extrusion screws of the extruders are arranged so as to make the compounds that they transport converge towards the extrusion head of the coextruded profiled element. The longitudinal axis of an extruder makes an acute angle (less than 90°) with the axis of the adjacent extruder. The coextruded profiled element is thus obtained by coextrusion of the two separate streams of compound, via flow ducts that connect the outlet orifice of the extruders to the extrusion head. The extrusion head is of the flat tip type or has a profiled fixed blade that cooperates with a rotary roller on which the coextruded product is placed.

Advantageously, said gear pump comprises two pinions, the axes of rotation of which are parallel to the longitudinal axis of the extruder that it feeds. This makes it possible to use a gear pump that has a simplified design and a reduced bulk.

Preferably, said pinions are herringbone pinions. This makes it possible to better channel the entering compound towards the central part of the pinions and to limit the risk of leakages towards the bearings of the pinions.

Advantageously, the gear pump has a body provided with an inlet orifice for an elastomer compound and with a delivery orifice for the compound.

Preferably, the inlet orifice of the gear pump is fed with an elastomer compound strip. The feed is a cold direct feed of an elastomer strip for a simplified structure of the assembly.

Advantageously, the inlet orifice of the gear pump is connected directly to the outlet orifice of a feed extruder for feeding an elastomer compound. In this way, each gear pump is fed with a hot compound that is fluidized, or homogenized, making possible to use at the outlet an extruder of which the screw only has the role of transferring the compound towards the extrusion head. This allows the design of the gear pump to be rendered more compact and less expensive while lengthening its service life.

Preferably, the installation of the disclosure has a control unit that synchronizes the speed of rotation of the screw with the speed of rotation of the gears of the gear pump.

This makes it possible to adjust the amount of work to be applied to the compound, the flow rate of which is determined by the gear pump. Thus, the speed of the extruder screw is chosen to be proportional to that of the gears of the pump depending on the amount of shear that is intended to be applied to the compound. For example, a slower speed of the screw applies more shear and heating to the compound, whereas a speed of the screw that is similar to that of the gears ensures more rapid transfer of the compound towards the outlet of the extruder.

The objective of the disclosure is also achieved by a coextrusion method for producing a coextruded profiled element for tires that is made from rubber compounds of different compositions, having at least one first extruder having a screw with a longitudinal axis, and at least one second extruder having a screw with a longitudinal axis, and an extrusion head connected to each of said extruders by appropriate ducts, characterized in that each extruder is fed with an elastomer compound coming from a gear pump.

Advantageously, the speed of rotation of the screw is synchronized with the speed of rotation of the pinions of the gear pump.

BRIEF DESCRIPTION OF THE DRAWINGS

The disclosure will be understood better from the remainder of the description, which is based on the following figures.

DETAILED DESCRIPTION OF THE ENABLING EMBODIMENT

In the different figures, identical or similar elements bear the same references. Their description is thus not systematically repeated.

Figure 1:
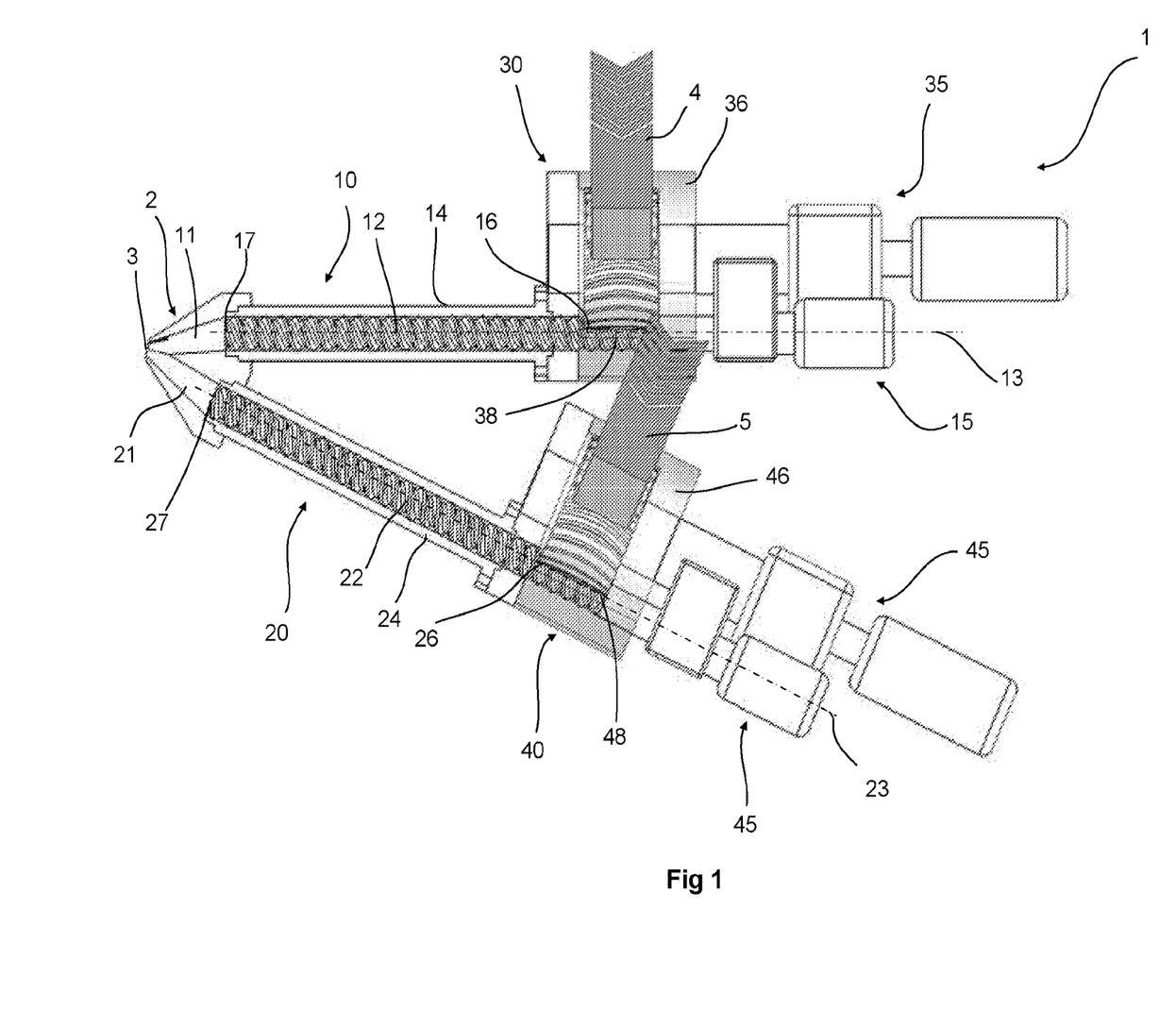
FIG. 1 is a view in axial section of an installation according to a first embodiment of the disclosure.
Figure 2:
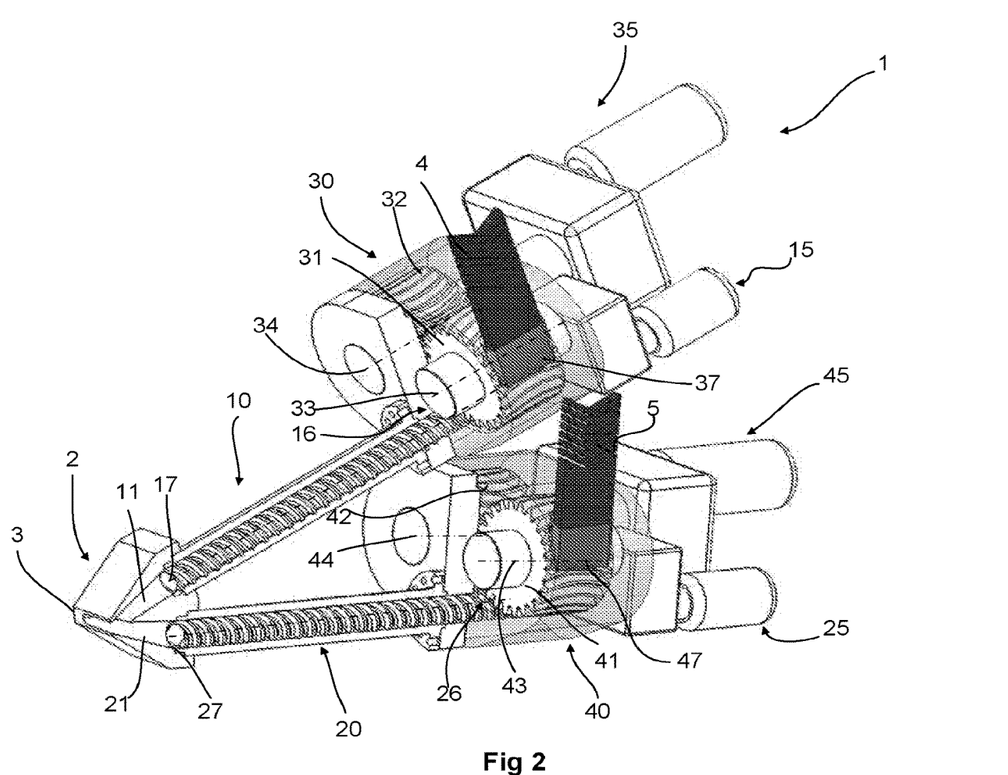
FIG. 2 is a perspective view in partial section of the installation in FIG. 1.

FIGS. 1 and 2 illustrate a coextrusion installation 1 according to a first embodiment of the disclosure. The view in section is on a plane that is parallel to the plane of symmetry of an extrusion head 2. The installation comprises two extruders 10 and 20, which each output into a duct 11 and 21, respectively, of the extrusion head 2.

The extruder 10 comprises an extrusion screw 12 or Archimedes screw and a barrel 14 for holding the screw, and also a geared motor 15 for driving the screw 12 in rotation about its longitudinal axis 13. The barrel 14 has a feed inlet 16 for feeding elastomer compound and an outlet 17 which leads into the duct 11. The extruder 20 comprises an extrusion screw 22 or Archimedes screw and a barrel 24 for holding the screw, and also a geared motor 25 for driving the screw 22 in rotation about its longitudinal axis 23. The barrel 24 has a feed inlet 26 for feeding elastomer compound and an outlet 27 which leads into the duct 21. The longitudinal axes 13 and 23 converge towards the extrusion head 2 and are symmetric with respect to the axis of symmetry thereof.

Rubber or elastomer is understood to mean preferably any type of diene or non-diene elastomer, for example thermoplastic elastomer, or a mixture of elastomers: natural rubber and synthetic rubber, reinforcing fillers: carbon black and silica, plasticizers: oils, resins and other chemical elements such as sulfur for example. The extrusion installation of the disclosure seeks to create a coextruded profiled element made from different compounds. Such different elastomer compounds are, by way of example, the elastomer or rubber compounds used to create a tread assembly, such as: a first material made of 100% natural rubber, to create a sublayer with one, then a second material to create the tread, made of 100% synthetic rubber. It is possible to add a third or even a fourth material to create the sidewalls, this further material being made of a natural rubber/synthetic rubber compound (containing 20% to 80% natural rubber).

According to the disclosure, each extruder 10, 20 is fed by a gear pump 30 and 40, respectively. The gear pump 30 comprises a feed inlet 37 for feeding a first elastomer compound and a delivery outlet 38 connected in a leaktight manner to the feed inlet 16 of the extruder 10. The gear pump 40 comprises a feed inlet 47 for feeding a second elastomer compound and a delivery outlet 48 connected in a leaktight manner to the feed inlet 26 of the extruder 20.

In the example illustrated in FIGS. 1 and 2, the pump 30 is fed using a strip 4 and the pump 40 is fed with a strip 5 of elastomer compound, the strips 4 and 5 being at ambient temperature. In a variant that is not shown in the drawings, the gear pump 30, 40 is provided with drive pinions for driving the compound strip 4, 5 into the pump, these drive pinions being placed, in a manner known to a person skilled in the art, in front of the inlet orifice 37, 47 of each pump.

Each gear pump 30 and 40 comprises two cylindrical pinions 31, 32 and 41, 42, respectively, with axes 33, 34 and 43, 44, respectively, that are mutually parallel and parallel to the longitudinal axis 13 and 23, respectively, of the extrusion screw 12 and of the extrusion screw 22, respectively. The pinion 31 is driven in rotation about its axis 33 by a geared motor 35 and the pinion 32 is driven in rotation about its axis 34 by the pinion 31. Similarly, the pinion 41 is driven in rotation about its axis 43 by a geared motor 45 and the pinion 42 is driven in rotation about its axis 44 by the pinion 41. The pinions 31 and 32 are housed in a casing 36 of the pump. The pinions 41, 42 are housed in a casing 46 of the pump.

In one embodiment variant of the disclosure, the pinions 31, 32 and 41, 42 have a straight toothing. In another embodiment variant, as can be seen more clearly in FIG. 3b, all of the pinions 31, 32 and 41, 42 are of the herringbone type.

The operation of a gear pump 30 of the disclosure will be explained with reference to FIGS. 3a and 3b. The elastomer compound enters the pump 30 in the direction of the arrow I through the inlet opening 37, which has a funnel-shaped cross section, so as to make it possible to properly fill the toothings of the pinion 31 with compound. The compound is transported by the teeth of the pinion 31 into a compression zone in which the teeth of the pinions 31 mesh with the teeth of the pinion 32. Under the effect of the pressure exerted by the teeth of the gearing, the compressed compound is sent into a vault 39 and leaves the pump in the direction indicated by the arrow II.

Figure 3A:
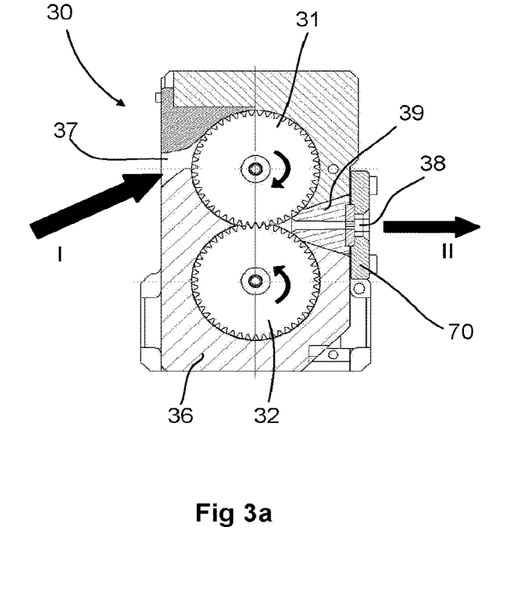
FIGS. 3a and 3b illustrate a view in section and a perspective view of a preferred embodiment variant of a gear pump used in the installation of the disclosure.

In the variant in FIG. 3a, the pump is mounted by means of a flange 70 on the barrel 14 of the extruder 10 so as to make the delivery outlet 38 of the pump 30 correspond with the feed inlet 16 of the extruder 10.

In another variant (FIGS. 1 and 2), the screw 12, 22 of the extruder 10, 20 passes through the casing 36, 46 of the gear pump 30, 40 and the upstream end of the barrel 14, 24 is fastened to the lateral face of the same casing.

Figure 3B:
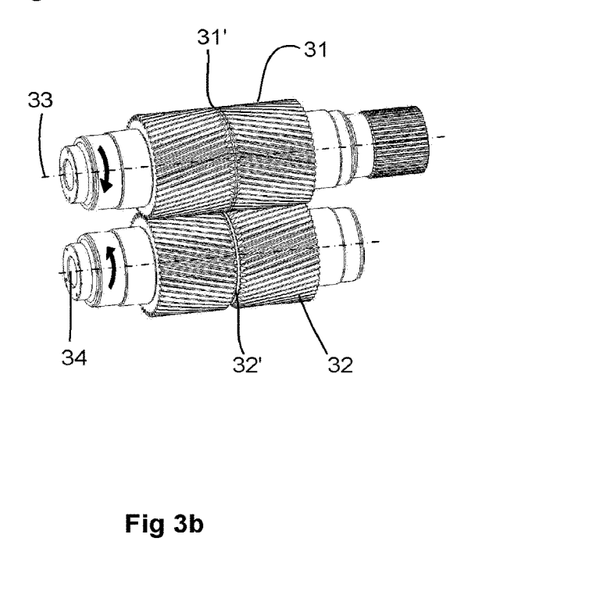

In an advantageous embodiment, preference is given to providing the pump 30 with pinions 31 and 32 of the herringbone type, as can be seen in FIG. 3b. The orientation of the herringbone pattern is such that it channels the stream of elastomer material towards the centre 31', 32' of each pinion 31, 32 and makes it possible to decrease the pressure on the edges of the pinions. This makes it possible to ensure a leaktight structure of the pump body at the lateral bearings for supporting the pinion shafts with simple seals and thus a simple and inexpensive mechanical structure of the gear pump. In this variant, the gear pump 40 has herringbone pinions and a structure similar to that of the pump 30.

In operation, the continuous feed of the gear pump 30, 40 makes it possible to fill the toothings of the drive pinions and affords a flow rate of material at the outlet that is constant and measurable. The speed of rotation of the screw 12, 22 of each extruder 10, 20 is controlled in synchronism with that of the gears of the dedicated pump and depending on the rheological properties of the compound that it transports. In this way, positive displacement extrusion is obtained at the outlet of each extruder, the flow rate of the material being constant and the material having been subjected to more or less shear between the feed inlet 16, 26 and the outlet 17, 27 of each extruder 10, 20. The extrudates that arrive at the outlet of each extruder are sent under pressure and without mixing into the ducts 11, 12 of the die in order in this way to obtain a coextruded profiled element.

The elastomer compound that passes through the extruder 10 is different (understood as meaning that it has different physicochemical properties) from that in the extruder 20. When the screws 12 and 22 are set in rotation, the two compounds are made to converge via the ducts 11 and 21 towards an outlet die 3 of the extrusion head 2, which means that bonding is made to occur in the raw state, at the pressure and temperature of the two compounds, without contact with the open air and prior to profiling. This makes it possible to obtain good integrity of the coextruded product at the interfaces between the compounds and a constant geometry of the assembly forming the coextruded profiled product.

Figure 4:
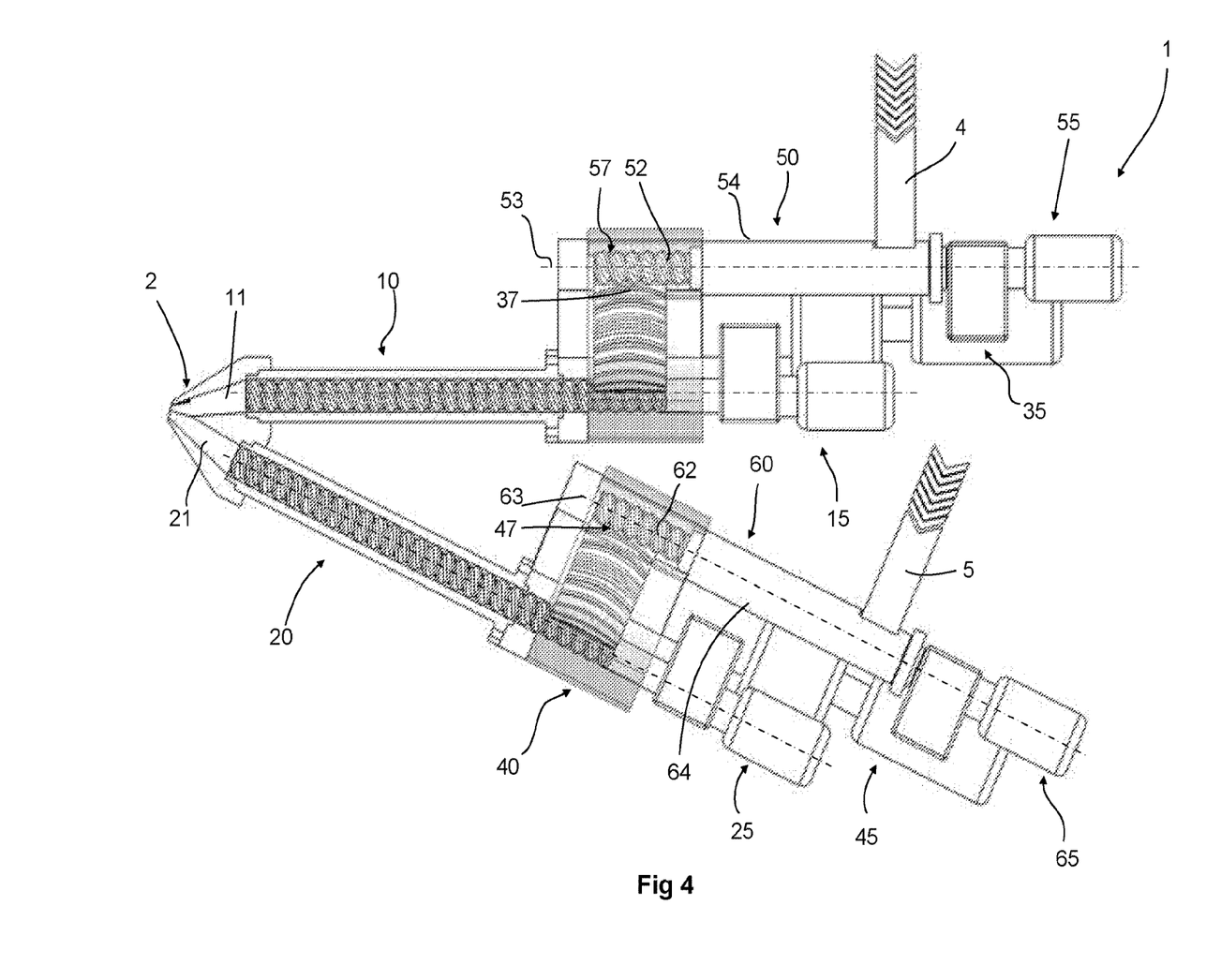
FIG. 4 is a view in axial section of an installation according to a second embodiment of the disclosure.
Figure 5:
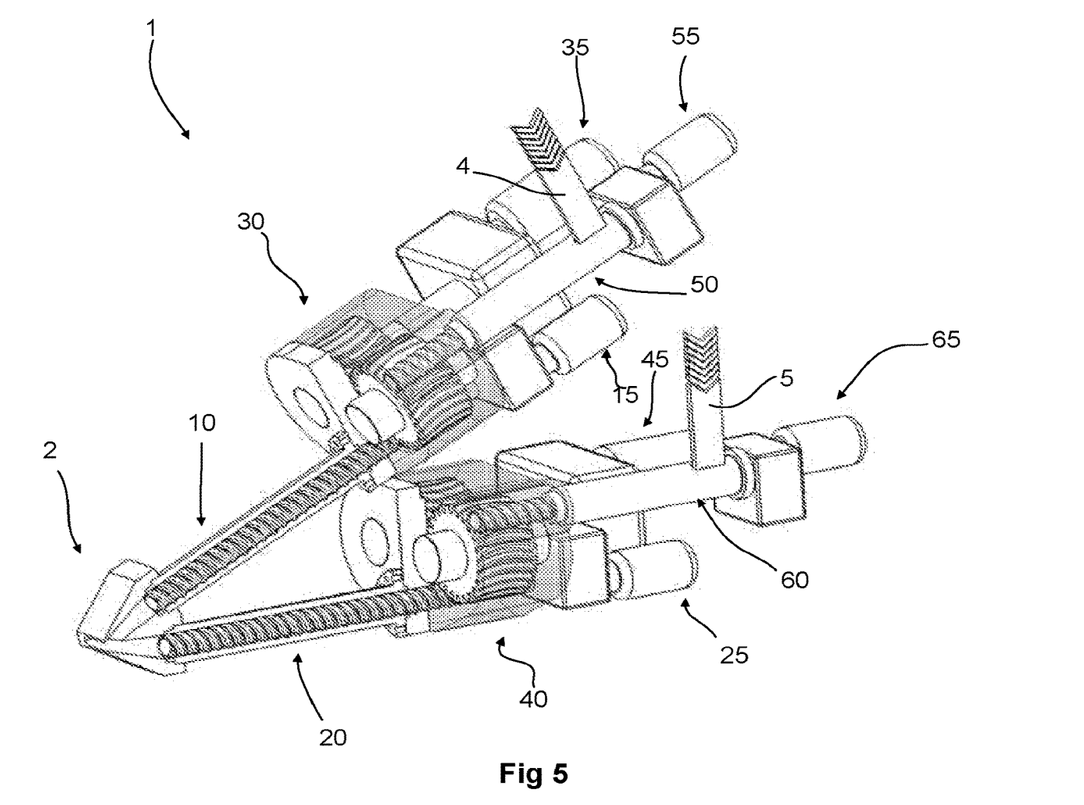
FIG. 5 is a perspective view in partial section of the installation in FIG. 4.

FIGS. 4 and 5 illustrate a coextrusion installation 1 according to a second embodiment of the disclosure. The view in section is on a plane that is parallel to the plane of symmetry of the extrusion head 2. The installation 1 in FIGS. 4 and 5 comprises a first extruder 10 and a second extruder 20 that are each fed by a gear pump 30 and 40, respectively, the structure and operation of which are similar to those described above. According to this embodiment, each gear pump 30, 40 is fed by a feed extruder 50 and 60, respectively.

The feed extruder 50 comprises an extrusion screw 52 or Archimedes screw and a barrel 54 for holding the screw, and also a geared motor 55 for driving the screw 52 in rotation about its longitudinal axis 53. The barrel 54 has a feed inlet 56 for feeding elastomer compound in the form of a strip 4, and an outlet 57 which leads in a leaktight manner into the inlet orifice 37 of the gear pump 30.

The feed extruder 60 comprises an extrusion screw 62 or Archimedes screw and a barrel 64 for holding the screw, and also a geared motor 65 for driving the screw 62 in rotation about its longitudinal axis 63. The barrel 64 has a feed inlet 66 for feeding elastomer compound in the form of a strip 5, and an outlet 67 which leads in a leaktight manner into the inlet orifice 47 of the gear pump 40.

In one advantageous embodiment, the longitudinal axis 53 is parallel to the axes 33, 34 of the pinions 31, 32, and the longitudinal axis 63 is parallel to the axes 43, 44 of the pinions 41, 42, for an installation 1 of optimal bulk. In another embodiment, the feed extruders 50, 60 are arranged tangentially to the inlet of the gear pump (their axes 53, 63 being perpendicular or inclined with respect to the axes of the pinions of the gear pump 30, 40).

According to this embodiment, each pump 30, 40 receives a feed of an elastomer compound that has already been worked, fluidized and brought to temperature. In this way, the gear pump 30, 40 is fed with a more fluid compound, making it possible to limit the load on the bearings and the wearing of the teeth of the gears and increasing the service life of the pump. Moreover, feeding a fluidised compound requires less torque and thus less installed power in the gear pump, which, as a result, may have a more compact structure and a lower cost. The structure of the extruders 10 and 20 can be simplified in this case, the screw thereof serving mainly to transfer the elastomer compound, the flow rate of which is metered properly by the pump and constant, towards the extrusion head 2.

Figures 6A, 6B, 6C:
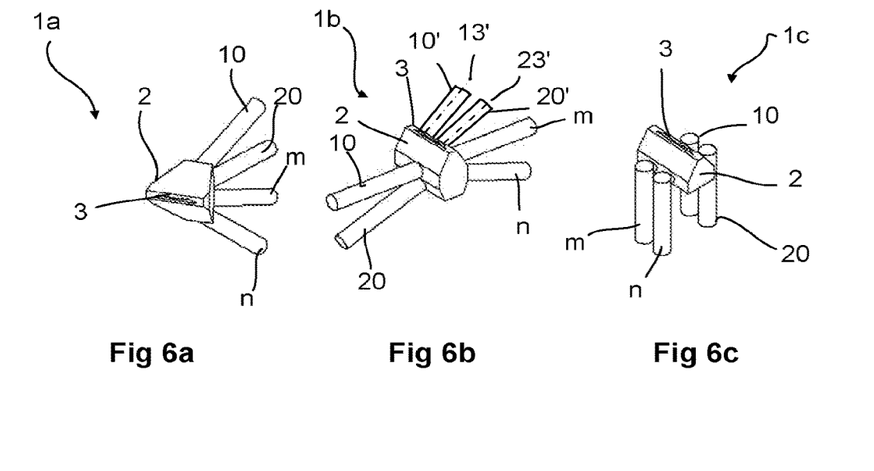
FIGS. 6a to 6c illustrate examples of coextrusion installations of the disclosure.

FIGS. 6a to 6c illustrate examples of coextrusion installations according to the disclosure that use several extruders that output in an extrusion head for extruding a coextruded complex product.

The installation 1a in FIG. 6a illustrates an arrangement of several extruders that are all disposed in the plane of symmetry of the extrusion head 2. Each extruder 10, 20, m, n is a positive displacement extruder which is fed with compound by a dedicated gear pump, as described above.

The installation 1b in FIG. 6b illustrates an arrangement of several extruders that are disposed on either side of the plane of symmetry of the extrusion head 2. Each extruder 10, 20, m, n is a positive displacement extruder which is fed with compound by a dedicated gear pump, as described above.

The installation 1c in FIG. 6c illustrates an arrangement of several extruders that are disposed side by side and on either side of the plane of symmetry of the extrusion head 2. Each extruder 10, 20, m, n is a positive displacement extruder which is fed with compound by a dedicated gear pump, as described above.

In another variant, which is not illustrated in the figures, at least two additional extruders 10', 20' are arranged with their longitudinal axes 13', 23' in a single plane that intersects the plane of symmetry of the extrusion head 2. Arrangements are made for the two extruders 10', 20' to output into flow ducts that are located in the plane defined by the axes 13', 23' for an optimal bulk of the extruders. This variant illustrated in FIG. 6b also applies in combination with the arrangements illustrated in FIGS. 6a and 6c.

In one variant, at least two of the extruders 10, 20, m, n output one and the same elastomer compound (of the same composition).

The installation comprises a control unit which is able to adjust the speed of rotation of the screws 12, 22 of the extruders 10, 20 and that of the drive pinions 31, 41 of the gear pumps 30, 40, in particular depending on the dimensions of the coextruded profiled element and on the rheological properties of the transported materials.

The control unit actuates the speed of the geared motors 15, 25, 35, 45 depending on the desired dimensions of the coextruded profiled element or on the operating conditions (variable speed, stop-start conditions). The speed of rotation of the drive pinions 31, 41 of the pumps 30, 40 is directly proportional to the variation in flow rate. This allows the control unit to adjust the flow rate of each extruder 10, 20 depending on the dimensions of the coextruded product and also to keep it constant during operation.

In one variant, the dimensions of the coextruded profiled element, in particular its width and thickness, are preestablished and measured using an optical sensor situated at the outlet of the extrusion head 2. The sensor checks the dimensions of the coextruded profiled element and the conformity thereof with the preestablished dimensions, being linked to the control unit. In one variant, a weight sensor measures the weight of the coextruded profiled element and is linked to the control unit, which thus makes even finer adjustments to the tolerances of the coextruded product.

In another variant, the control unit is also connected to the pull-off means that pull off the strip of coextruded profiled element in order to adjust the speed thereof.

Other variants and embodiments of the disclosure can be envisaged without departing from the scope of its claims.

Thus, in a more economical variant, a single geared motor assembly is used to simultaneously drive the screw and the shafts of the pinions of the gear pump situated upstream thereof in rotation. In an even more economical variant, a single geared motor drives the screw of the feed extruder, the pinions of the gear pump and the extrusion screw of the extruder, which transfers the compound into the extrusion head, in rotation.

In another variant, the pumps 30 and 40 have different structures from one another or have the same structure but different dimensioning of their respective components (for example the diameter of the pinions is different from one pump to the other).

What is claimed is:

1. A coextrusion installation for producing a coextruded profiled element for tires that is made from rubber compounds of different compositions, having at least one first extruder having a screw with a longitudinal axis, and at least one second extruder having a screw with a longitudinal axis, and an extrusion head connected to each of said extruders by appropriate ducts, wherein the feed inlet of each extruder is connected to the delivery orifice of a gear pump so that the gear pumps are positioned upstream of the extruders and each combination of one of the gear pumps and the corresponding screw connected to the extrusion head forms a positive-displacement extruder, and wherein for each positive-displacement extruder, the gear pump meters a flow rate of the corresponding rubber compound that the screw transfers from the gear pump towards the extrusion head in such a manner that the positive displacement extrusion obtained at the outlet of the positive-displacement extruder is determined and controlled by the gear pump.

2. The installation according to claim 1, wherein the axes of the extruders make an acute angle between one another.

3. The installation according to claim 1 wherein said gear pump comprises two pinions, the axes of rotation of which are parallel to the longitudinal axis of the extruder that it feeds.

4. The installation according to claim 3, wherein said pinions are herringbone pinions.

5. The installation according to claim 1, wherein the gear pump has a body provided with an inlet orifice for an elastomer compound and with a delivery orifice for the compound.

6. The installation according to claim 5, wherein the inlet orifice of the gear pump is fed with an elastomer compound strip.

7. The installation according to claim 5, wherein the inlet orifice of the gear pump is connected directly to the outlet orifice of a feed extruder for feeding an elastomer compound.

8. A coextrusion method for producing a coextruded profiled element for tires that is made from rubber compounds of different compositions, having at least one first extruder having a screw with a longitudinal axis, and at least one second extruder having a screw with a longitudinal axis, and an extrusion head connected to each of said extruders by appropriate ducts, wherein each extruder is fed with an elastomer compound coming from a gear pump so that the gear pumps are positioned upstream of the extruders and each combination of one of the gear pumps and the corresponding screw connected to the extrusion head forms a positive-displacement extruder, and wherein for each positive-displacement extruder, the gear pump meters a flow rate of the corresponding rubber compound that the screw transfers from the gear pump towards the extrusion head in such a manner that the positive displacement extrusion obtained at the outlet of the positive-displacement extruder is determined and controlled by the gear pump.

* * * * *